United States Patent [19]

van der Lely

[11] 4,199,922
[45] Apr. 29, 1980

[54] MOWING MACHINE

[76] Inventor: Cornelis van der Lely, 7, Brüschenrain, Zug, Switzerland

[21] Appl. No.: 930,800

[22] Filed: Aug. 3, 1978

[30] Foreign Application Priority Data

Aug. 10, 1977 [NL] Netherlands .......................... 7708801
Aug. 10, 1977 [NL] Netherlands .......................... 7708802

[51] Int. Cl.$^2$ .......................................... A01D 55/262
[52] U.S. Cl. ...................................... 56/13.6; 56/192; 56/295
[58] Field of Search ..................... 56/6, 13.6, 157, 192, 56/295; 74/801, 665 GA, 413, 665.6 D

[56] References Cited

U.S. PATENT DOCUMENTS

| 457,606 | 8/1891 | Norcross | 74/665 GA |
|---|---|---|---|
| 1,604,604 | 10/1926 | Powell | 74/801 |
| 2,539,934 | 1/1951 | Smith et al. | 56/13.6 |
| 2,665,540 | 1/1954 | Dudley | 56/295 |
| 3,469,378 | 9/1969 | Heesters et al. | 56/13.6 |
| 3,500,622 | 3/1970 | Bowen | 56/295 |
| 3,501,901 | 3/1970 | Lely | 56/13.6 |
| 3,513,648 | 5/1970 | Kline et al. | 56/13.6 |
| 3,540,198 | 11/1970 | Heth et al. | 56/295 |
| 3,715,874 | 2/1973 | Gosierud | 56/295 |
| 3,835,630 | 11/1973 | Av | 56/295 |

FOREIGN PATENT DOCUMENTS 1326900 8/1973 United Kingdom ..................... 56/295

Primary Examiner—Louis G. Mancene
Assistant Examiner—Paul J. Hirsch
Attorney, Agent, or Firm—Mason, Mason and Albright

[57] ABSTRACT

A mowing machine adapted to be connected to a three-point lifting device of a tractor and powered by a power take-off therefrom, the mowing machine extending laterally to the side of the tractor and having two mowing assemblies, each of which includes a rotor which is powered by a gear chain and belts from the power take-off and is mounted by bearings to rotate about a substantially vertical axis which also contains a stationary shaft having the same longitudinal axis as the axis of rotation of the rotor. The vertical stationary shaft has a non-rotatable ring gear at its lower aspect which is surrounded by the rotor which, by a cover plate on its underside supports spur gears which mesh with the ring gear and also cutting elements, the arrangement being that the cutting elements rotate much faster than the rotor and are caused to rotate by the meshing of their individual spur gears with the ring gear. The rotor rotates in one direction whereby crop is guided between the two rotors of the two assemblies to form a windrow and the cutting elements rotate in the opposite direction to cut the crop, the latter rotation being at least twice and preferably 8 to 10 times faster than the rotation of the rotor. Supporting dishes for supporting the cutting elements the desired height above the ground may be connected under the rotating members or at the side thereof. Arcuate segments extend from the underlying cover plate to protect the rotating cutting elements.

30 Claims, 4 Drawing Figures

MOWING MACHINE

SUMMARY OF THE INVENTION

This invention relates to a mowing machine.

According to the invention there is provided a mowing machine comprising at least one mowing assembly with a rotor which is mounted for rotation about an upwardly extending main axis and which carries at least one mowing element, which is provided with at least one cutting member, said mowing element being rotatable about an upwardly extending axis which is spaced from said main axis, in which near the mowing element the rotor comprises a rim with a non-circular circumference.

For a better understanding of the present invention and to show how it may be carrier into effect, reference will now be made, by way of example only, to the accompanying drawings, in which:

BRIEF DESCRIPTION OF THE DRAWINGS

FIG. 4 is a plan view of part of an alternative embodiment of the mowing machine of the invention.

DESCRIPTION OF THE PREFERRED EMBODIMENTS

Figure 1:
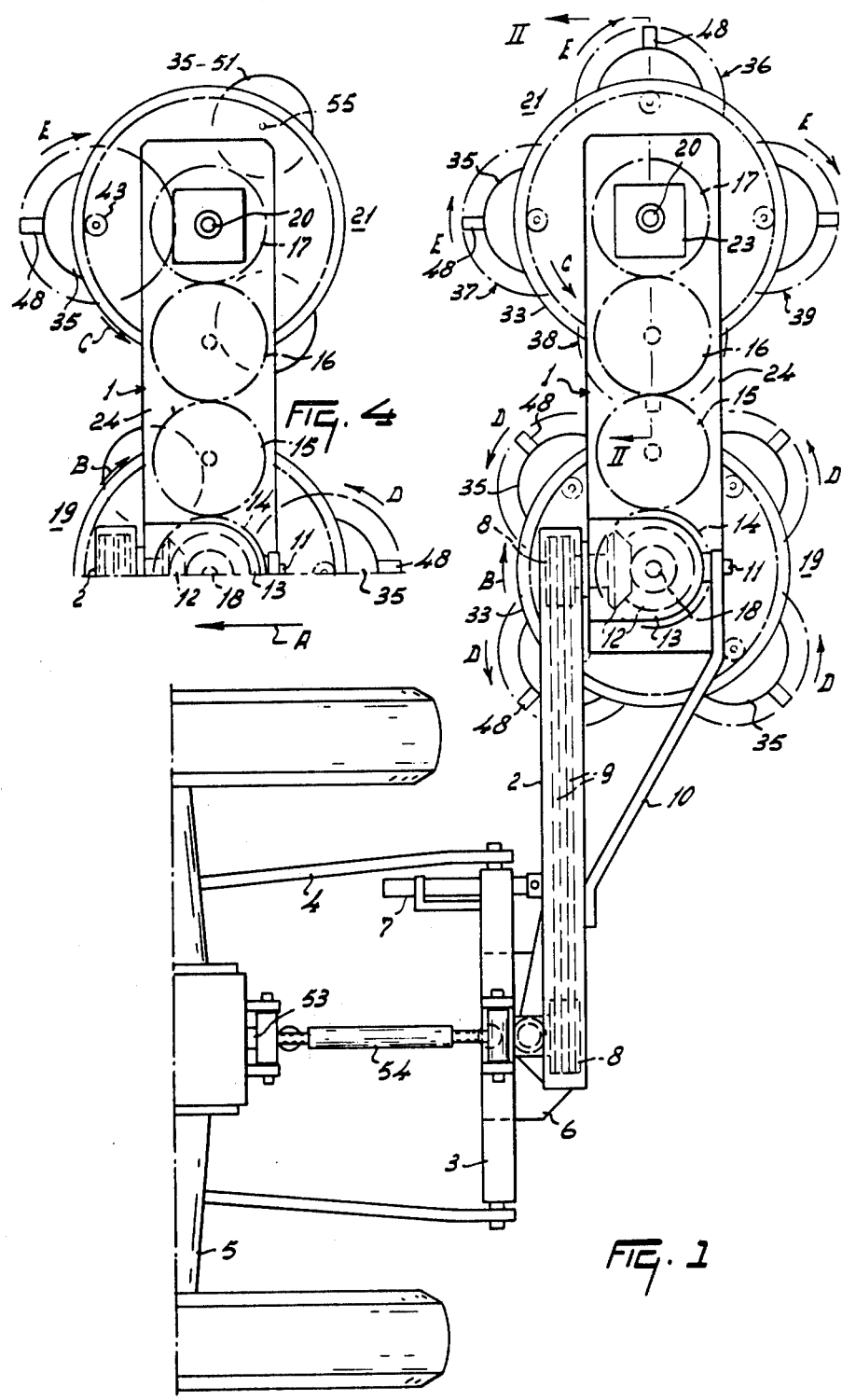
FIG. 1 is a plan view of a crop working machine, constituted by a mowing machine, hitched to a tractor.

The mowing machine shown in FIG. 1 comprises a main frame beam 1, which is connected by an intermediate frame 2 and a trestle 3 to a three-point lifting device 4 of a tractor 5. The trestle 3 has a substantially triangular shape, as viewed in the intended direction of operative travel, indicated by an arrow A, and is provided near its lower side with a substantially horizontal supporting plate 6, on which the intermediate frame 2 is arranged. The intermediate frame is furthermore connected with the three-point trestle 3 by means of a shear-pin device 7, now disclosed in detail, in a manner such that, if the machine encounters excessive resistance during operation, the intermediate frame 2 can turn relatively to the trestle 3 about an upwardly extending pivotal shaft. The intermediate frame 2 accommodated two pulleys 8 with V-belts 9 passing over them. On the rear side of the intermediate frame 2 is disposed a supporting rod 10, with an end away from the intermediate frame 2 which is connected to a pivotal shaft 11. The pivotal shaft 11 coincides with the rotary axis of the outermost pulley 8 (i.e. the one farthest from the trestle 3); this outermost pulley 8 is connected to a bevel gear 12 forming part of a bevel gear transmission located in a gear box 13 fastened to the top side of the main frame beam 1. From the gear box 13 is driven an underlying, substantially straight cylindrical gear 14, journalled in a gear box, which is enclosed by the main frame beam 1. The gear 14 is the first of a series of four gears 14, 15, 16 and 17 lying side by side and being all rotatably arranged in an oil bath. The rotary axis of the gear wheel 14 constitutes the rotary axis 18 of a first crop working assembly constituted by a mowing assembly 19. In a similar manner the rotary axis of the gear wheel 17 constitutes a substantially vertical rotary axis 20 of a second mowing assembly 21. The transmission through the gear wheels 14 to 17 results in the mowing assemblies 19 and 21 rotating in opposite senses, as indicated by arrows B and C respectively.

The mowing assemblies 19 and 21 are structurally identical and so only the mowing assembly 21 will be described in detail. The rotary axis 20 of the mowing assembly coincides with the centerline of a shaft 22, which is supported near the top of the beam 1 in a fastening portion 23. This fastening portion 23 is fastened by bolts to a cover 24 of the main frame beam 1. The reduced diameter portion 25 of the shaft 22 located in the beam 1 supports a bearing 26 at its lower end, this bearing 27 being disposed in the gear 17. An externally partly cylindrical sleeve or ring 27 is bolted to the lower side of the gear 17 concentrically with the shaft 22, this sleeve extending beneath the beam 1, the lower part being directed outwardly. The ring 27 is surrounded at the circumference by an oil arrester 28 fastened to the bottom of the beam 1. The ring 27 constitutes the suspension part for the rest of the mowing assembly 21, and to this end the outwardly directed lower part of the ring 27 is fastened to the top of a substantially conical casing 29. The vertex of the conical surface of the casing 29 is located on the rotary axis 20 just above the fastening portion 23. The angle that this conical surface makes with the rotary axis 20 is preferably about 20°.

Near its lower side, the casing 29 is connected with a housing 30 which supports the shaft in a bearing 31 and which flares downwardly from the bearing 31. The casing 29 and the housing 30 constitute a rotor. The angle between the surface of the housing 30 and the main axis 20 is preferably about 75°. Near the circumference of the mowing assembly the housing 30 is directed downwardly to form a cylindrical portion 32 of the housing 30. Beneath the portion 32 the housing 30 has an outwardly directed, substantially horizontal rim 33 serving as a fastening means for a cover plate 34, which closes the housing 30 at the bottom and extends substantially perpendicular to the rotary axis 20. The cover plate 34 has a non-circular rim, coincide with four arcuate segments or screening plates 35 projecting outwardly from the rim 33 which plates constitute upper covers for respective crop working elements constituted by mowing elements 36, 37, 38 and 39, which are identical in structure to each other, and so only the mowing element 36 will be described in detail. The mowing element 36 is rotatable about a substantially vertical rotary axis 40 which coincides with the centerline of a stub shaft 41. This stub shaft 41 is journalled in the cover plate 34 by means of two bearings 42 disposed one above the other. The disposition in such that dirt or soil cannot penetrate into the housing. The rotary axis 40 intersects the conical upper wall of the housing 30 approximately midway along the radial distance between the cylindrical part 32 and the place where the conical surface of the casing 29 meets the upper wall of the housing 30. The four shafts 40 are preferably located on a circle centered on the shaft 20. On the top end of the stub shaft 41 is arranged a substantially cylindrical, spur gear 43, which is drivably connected with a ring gear 44. The ring gear 44 has a hub 45, which is fitted by means of a wedge just beneath the bearing 31 on the shaft 22. The ring gear 44 comprises an internally toothed cylindrical part 46 which is drivably in mesh with teeth on the gear 43. Since the housing 30 is closed by the plate 34, the gears 43 and the gear 44 can rotate in an oil bath.

Figure 2:
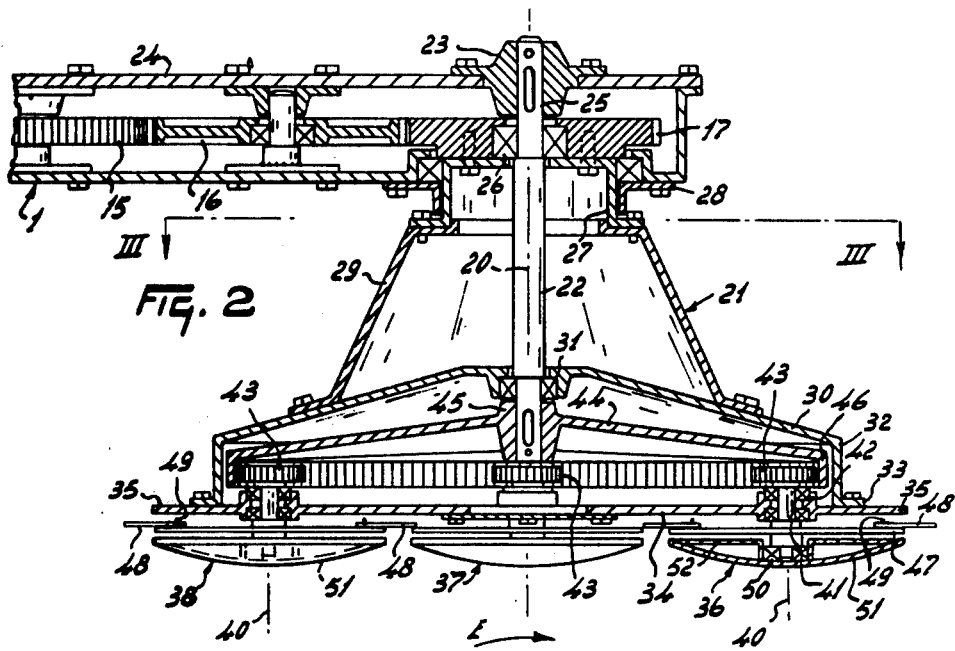
FIG. 2 is an enlarged sectional view of part of the mowing machine taken on the line II—II in FIG. 1.

Beneath the cover plate 34 the stub shaft 41 is connected with a carrier 47 shaped as a substantially circular disc being provided at the top near the circumference with two substantially diametrically oppositely disposed cutting members 48 comprising steel knives. The knives 48 are pivotable about upwardly extending pivotal shafts 49 so that the knives can turn freely through an angle of 360°. As is shown in FIG. 2, the arcuate screening plate 35 extends outwardly so that, as viewed on plan, the outer edge of the plate 35 substantially coincides with the circumference of the disc 47; preferably it slightly projects beyond the disc 47. Thus the knives 48 are covered vertically over substantially half their length by the plate 35. The diameter of the mowing element 36 is preferably about thirty centimeters and the diameter of the entire mowing assembly 21 is preferably about eighty-five centimeters.

Figure 3:
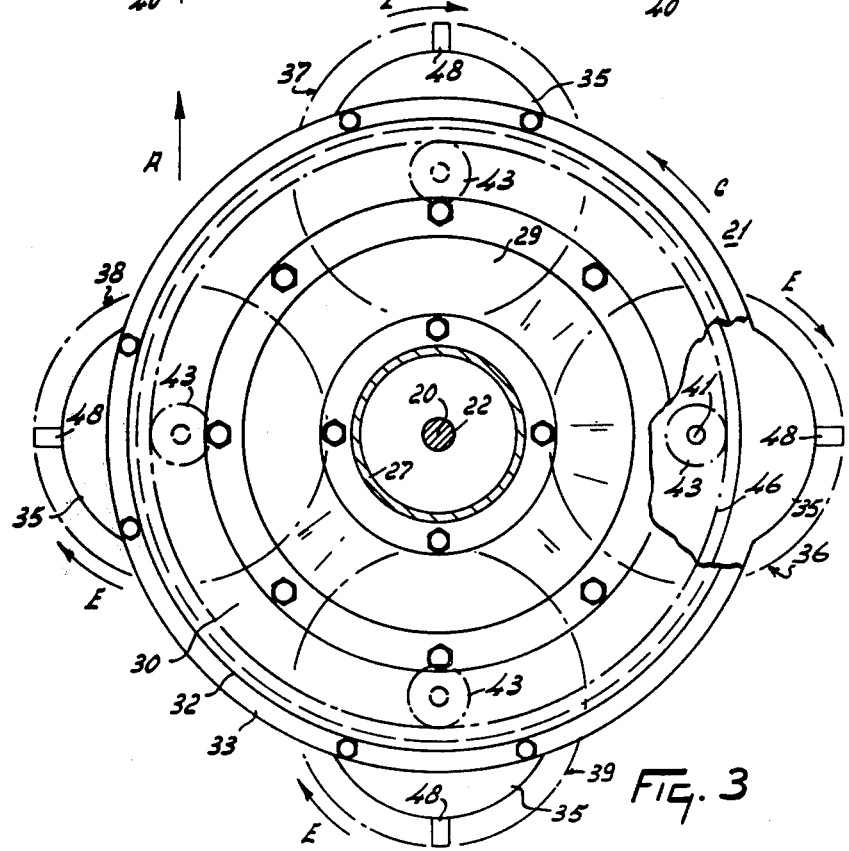
FIG. 3 is a partly sectional view taken on the line III—III in FIG. 2.

At the bottom end of the stub shaft 41 there is a bearing 50 which serves to carry a supporting member comprising a convex circular supporting dish 51. The dish 51 extends substantially to the circumference of the disc 47 and is covered on top by a flat cover plate 52 which surrounds the bearing 50. The mowing machine shown in FIGS. 1 to 3 operates as follows.

During operation the mowing machine is driven from the power take-off shaft 53 of a tractor 5 through an intermediate shaft 54, so that the respective casings 29, the housings 30 and the cover plates 34 rotate in the direction indicated by the arrows B and C respectively. The speed of rotation is preferably about 500 rev/min. Since the ring wheel 44 is rigidly secured to the stationary shaft 22 and the cutting members 36 to 39 rotate bodily with the carrier or casing 29, the respective gears 43 will roll along the teeth of the ring gear 46 of the wheel 44. The rotation of the mowing element of each mowing assembly takes place in the direction of the arrows D and E respectively (FIGS. 1 and 3), this rotation thus being in the direction opposite that of the rotation of the casing 29 of that mowing assembly. For satisfactory operation, the speed of each mowing element should be more than twice that of the casing 29. This ratio is preferably at least 1:8 and most preferably 1:10. Thus a preferable speed is about 5000 rev/min. By the choice of the diameter of the housing 30 with respect to the diameters of the mowing elements 36–38, the planetary gear system comprising the gears 43 and 46 provides, in absolute terms, a high cutting speed for the cutting members so that, for example, grass-like crops can be received in the upright state by the casings 29, which convey the crop upwardly in the direction of the arrow C by virtue of the conical shape. The rims 33 and 34 with the screening plates 35 protect the cut crops against double cutting, transporting the cut crop away from the mowing elements, increasing in this way the quality of mowing. Inasmuch as rim 34 has a non-circular circumference, because of the arcuate plates 35, the conveying of cut crop in the direction of the arrow C take place. The rim gives a good protection of the mowing elements. The speed of rotation of the rim is comparatively so low, that the rim offers no disturbing of the cutting action (for example by pushing away the standing crops before mowing). If desired, unevennesses (not shown) may be provided on the outer surface of the casing. The cutting members act with a scything action, i.e. there are no countermembers to provide a scissor action. The relative dispositions he nia uer surae the huin 30 and the ain 29 may e advanaeou he ie direin raion he ming elemen ih ree the direion ratin he ain may be advantaeu in min dnast, long-stalk crop, since under given conditions an elevating effect can be obtained. At the rear of the mowing machine the crop is deposited in an airy, yet sharply defined swath. The mowing machine shown permits of using small and comparatively light mowing elements with a comparatively large mowing assembly for high-speed operation. The disposition of the four mowing elements 36 to 39 provides satisfactory balancing of each mowing assembly. The comparatively simple planetary driving system permits, in addition, of using a considerably slower, crop conveying rotary drum.

The plan view of FIG. 1 shows that the mowing elements of the neighboring mowing assemblies are relatively off-set through an angle of about 45° so that the mowing elements have a satisfactory overlap.

The mowing elements are each supported in an effective manner by a separate supporting dish, which is preferably freely rotatable on the stub shaft 41 of the mowing element. Owing to the presence of this light support readily matching the unevennesses of the ground in the region where the cutting effect takes place, that is to say, near the circumference of the mowing assembly, a uniform cutting effect can be obtained even on an irregular ground surface.

In the embodiment shown in FIG. 4 only one mowing element is provided on each mowing assembly, this mowing element being preferably constructed as shown in the preceding embodiment; corresponding parts are therefore given the same reference numerals.

In the cover plate 34 are arranged two shafts 55, the shafts 55 and the stub shaft 41 being regularly disposed about the main shaft 20, the arc between the two shafts 55 being, therefore, about 120°. Beneath the shafts 55 are provided supporting dishes 51 which are freely rotatable in the manner illustrated in FIG. 2 but do not have cutting members. During operation the embodiment of the mowing machine shown in FIG. 4 operates in the manner described for the first embodiment. The variant shown in FIG. 4 is particularly suitable for very high speed use, while the regular disposition of the shafts 41 and 55 ensures satisfactory balancing of the mowing assembly. As a further alternative (not shown) two mowing elements may be disposed diametrically opposite each other, one on each side of the main shaft 20, and two diametrically oppositely disposed supporting dishes 51 may be arranged in positions off-set from the mowing element by 90°.

It is furthermore possible to use the construction with a planetary gear wheel transmission in mowing machines having a row of three, four, or more mowing assemblies, while it is also possible to attach the mowing machine not to the rear but to the front of a tractor, or to both the front and the rear.

Although various features of the machine described and illustrated in the drawings, will be set forth in the following claims as inventive features, it is to be understood that the invention is not necessarily limited to these features and may encompass all of the features that have been disclosed both individually and in various combinations.

Having described my invention, what I claim as new and desire to secure by Letters Patent of the United States is:

1. A mowing machine comprising at least one mowing assembly which includes a rotor mounted in said assembly for rotation about a substantially vertical main axis and which carries at least one mowing element, at least one cutting member provided on said mowing element, said mowing element being rotatable about a further vertical axis which is spaced from said main axis, said rotor comprising a rim located proximate said mowing element, said rim having a non-circular circumference.

2. A mowing machine as claimed in claim 1, in which said rim comprises an outwardly projecting screening plate.

3. A mowing machine as claimed in claim 2, in which said screening plate provides a protective cover for said mowing element.

4. A mowing machine as claimed in claim 3, in which the circumference of said screening plate is arcuate shaped.

5. A mowing machine as claimed in claim 4, in which said rim comprised at least two screening plates.

6. A mowing machine as claimed in claim 1, in which said rim comprises part of the underside of said rotor.

7. A mowing machine as claimed in claim 1, in which a separate supporting member is provided for supporting said mowing element on the ground.

8. A mowing machine comprising at least one mowing assembly which includes a rotor mounted for rotation about a substantially vertical main axis and which carries at least one mowing element, said mowing element being provided with at least one cutting member and being rotatable about a further substantially vertical axis which is spaced from said main axis, a separate supporting member being provided for supporting said mowing element on the ground.

9. A mowing machine as claimed in claim 8, in which said mowing assembly comprises at least one further mowing element whereby it includes at least two mowing elements each of which is mounted for rotation about a separate further substantially vertical axis spaced from said main axis, said further axes being disposed on a circle centered on said main axis, supporting members being provided for supporting each said mowing element on the ground.

10. A mowing machine as claimed in claim 9, in which each said supporting member is located vertically below a respective said mowing element.

11. A mowing machine as claimed in claim 10, in which each said supporting member is connected with a shaft having a longitudinal axis coincident with said further axis of the respective mowing element.

12. A mowing machine as claimed in claim 11, in which each said supporting member is convex and circular as viewed in a direction parallel to the corresponding said shaft.

13. A mowing machine as claimed in claim in which each said mowing element comprises a carrier on which said cutting member is pivotally secured.

14. A mowing machine having a substantially vertical main axis and comprising housing means which rotates about said main axis, said housing means mounting a mowing element for rotation about a further substantially vertical axis which is spaced from said main axis, said mowing element comprising a rotary carrier and a cutting member which is pivotally secured to the top of said carrier.

15. A mowing machine as claimed in claim 14, in which said mowing element is provided a further cutting member which is secured thereto diametrically opposite said first mentioned cutting member.

16. A mowing machine as claimed in claim 14, in which said cutting member is disposed whereby approximately one-half of its length is disposed within the periphery of its said carrier.

17. A mowing machine as claimed in claim 16, in which said cutting member is freely pivotable and capable of pivoting 360°.

18. A mowing machine as claimed in claim 14, in which said mowing assembly cooperates with a second mowing assembly similar to said first mentioned assembly whereby, in operation, said two mowing assemblies rotate in opposite senses.

19. A mowing machine as claimed in claim 14, in which the speed of rotation of said mowing assembly is about 500 revolutions per minute and the speed of rotation of said mowing element is about 5000 revolutions per minute.

20. A mowing machine as claimed in claim 14, in which said mowing element is constructed to cut with scything action.

21. A mowing machine as claimed in claim 14, which is provided with means for attaching it to the three-point lifting device of a tractor.

22. A mowing machine as claimed in claim 19, in which the working width of the machine is about 1.6 meters.

23. A mowing machine as claimed in claim 19, which is provided with means whereby it can be driven from the power take-off shaft of the tractor.

24. A mowing machine comprising a mowing assembly which is mounted for rotation about a substantially vertical extending main axis and which carries a mowing element mounted for rotation about a further substantially vertical axis spaced from said main axis, said assembly including a rotatable casing, said mowing element being drivable by said casing, a wall included in said casing which is inclined to said main axis.

25. A mowing machine as claimed in claim 24, in which said casing comprises an outer surface which is, at least in part, conical in shape.

26. A mowing machine as claimed in claim 25, in which said part of said outer surface of said casing has the shape of a truncated cone, the vertex of which is spaced above said mowing assembly on said main axis.

27. A mowing machine as claimed in claim 26, in which said casing is provided with an underlying housing having a further conical outer surface which has a larger cone angle than the first-mentioned conical surface of said casing, said casing and housing rigidly connected together and forming a rotor, said mowing element mounted in said housing.

28. A mowing machine as claimed in claim 27, in which said housing has a cylindrical outer surface disposed between a lower rim and said outer conical surface.

29. A machine as claimed in claim 21, in which said rim extends in a substantially horizontal direction.

30. A mowing machine as claimed in claim 24, in which said main axis in coincident with the longitudinal axis of a main shaft which extends through a spur gear located above said mowing assembly, said main shaft being rigidly secured to the top side of a gear box mounted on said assembly which accommodates said spur gear.

* * * * *